March 6, 1928.
T. M. MANSON
1,661,186
AIR SERVICE EQUIPMENT
Filed Oct. 7, 1926
2 Sheets-Sheet 1
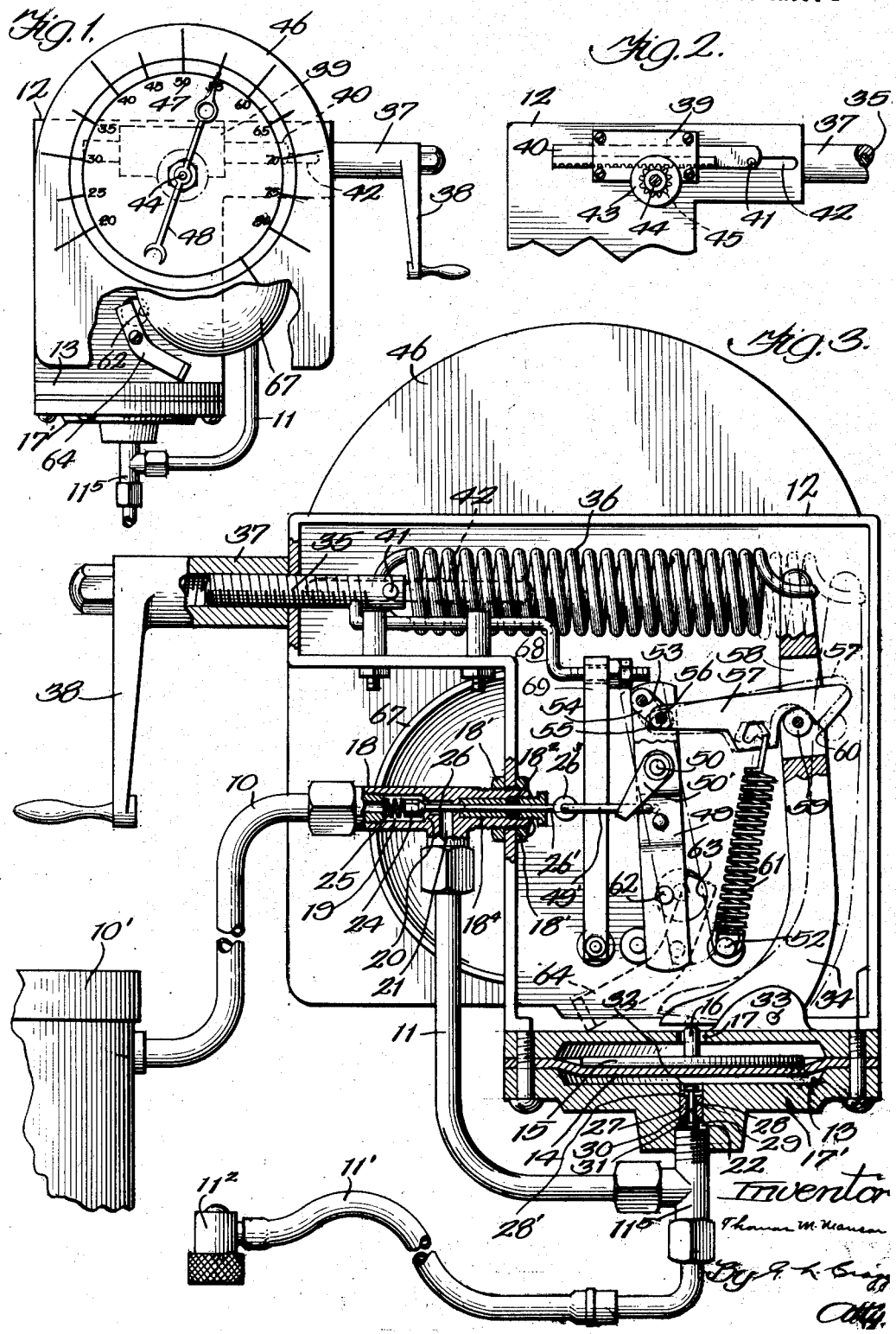

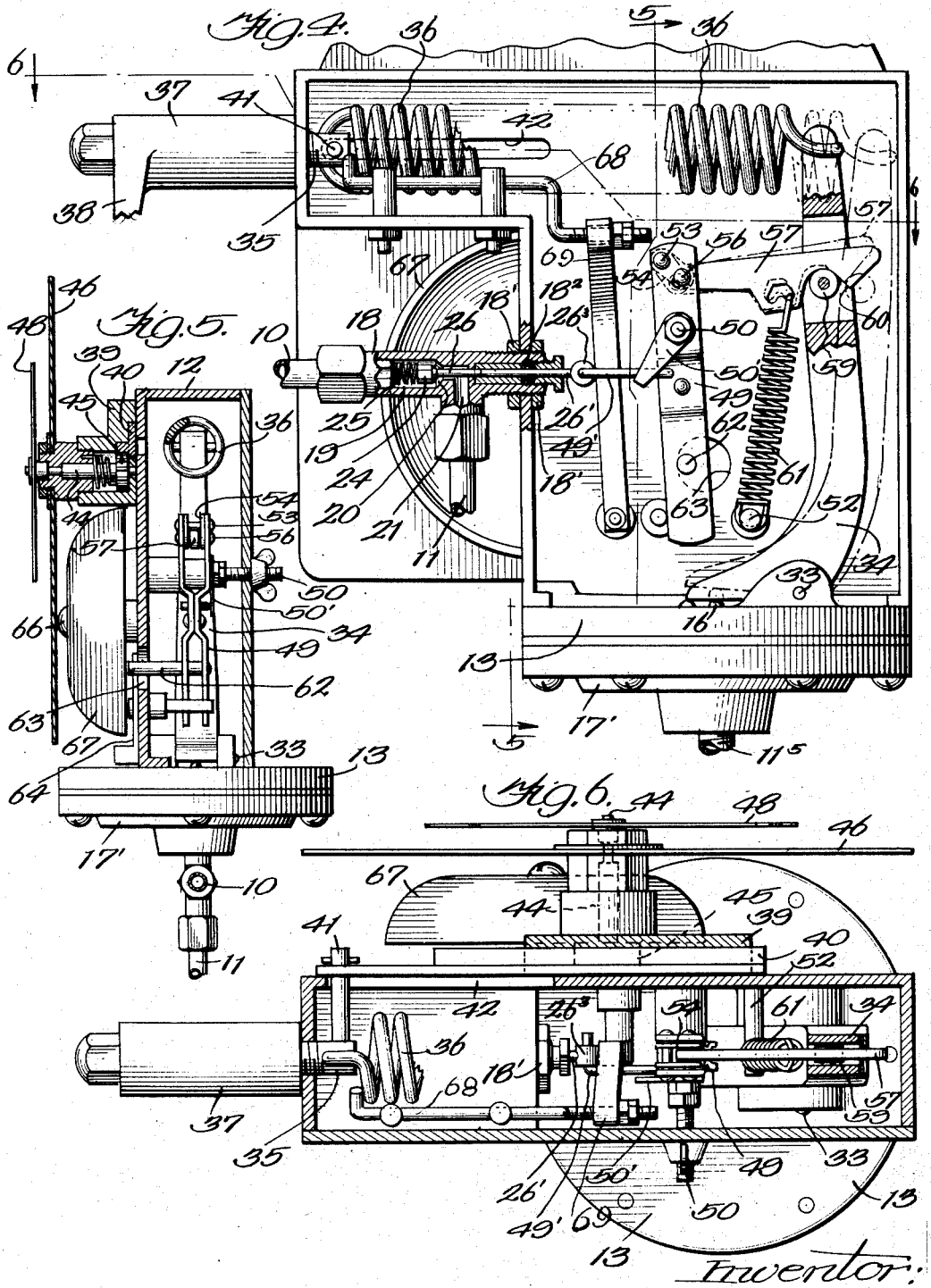

Patented Mar. 6, 1928.

1,661,186

UNITED STATES PATENT OFFICE.

THOMAS M. MANSON, OF TORONTO, ONTARIO, CANADA, ASSIGNOR TO SERVICE STATION EQUIPMENT COMPANY, OF BRYAN, OHIO, A CORPORATION OF OHIO.

AIR-SERVICE EQUIPMENT.

Application filed October 7, 1926. Serial No. 140,222. REISSUED

My invention relates to air service equipment in which the flow of air from a tank or other source to an automobile pneumatic tire or other receiver is controlled by means of a valve which is designed to sever the communication between the source and receiver when air under sufficient pressure has been supplied to the receiver.

In such apparatus, means are employed, influenced by the pressure of the air within the receiver, for effecting closure of the valve, such means being regulable so that different receivers may be supplied with air under different pressures. For example, pneumatic tires may be supplied with air under different pressure suited to the desires of the users thereof and the nature and purpose of the tires. By means of such apparatus as this, it is not necessary to disconnect the receiver from the source, from time to time, to ascertain the degree of air pressure within the receiver being supplied. In the case of air service stations equipped to furnish automobile pneumatic tires with air, it is customary to employ regulable means which will permit the supply of air to tires up to a pressure of eighty pounds, without the necessity of testing. Occasionally, a motor vehicle, such as a truck, is supplied with pneumatic tires requiring greater air pressure. In order that an air service station equipped with the regulable valve controlling mechanism, herein mentioned, may be also used to supply air under greater pressure than that permitted by such mechanism, I provide means that are then employed to hold the valve open in which case the pressure of the air supplied to the tire requiring the higher pressure is tested from time to time following the disconnection thereof from the source, somewhat as hitherto.

In the preferred embodiment of the invention, the regulable means that controls the closure of the valve performs its function normally throughout the range of pressures which are to be supplied to receivers without testing. This regulable means includes a controlling element which may be manually adjusted beyond its normal range of adjustment and when being adjusted beyond its normal range of adjustment, mechanism in conjunction therewith comes into play to maintain the valve open. By this means no testing is required during the time that the pressure up to normal maximum is being supplied to the receiver but when the remaining pressure is being supplied, above the normal maximum, testing of the pressure supplied to the receiver is proceeded with from time to time, as hitherto.

The apparatus of my invention is of particular service in connection with those air service equipments in which air is supplied from the source to the piping that leads to the receiver at the pressure of the source instead of having this pressure reduced at the piping leading to the receiver, though the invention is not to be thus limited.

The preferred embodiment of my invention is shown in the accompanying drawings in which Fig. 1 is a front view of the preferred form of regulating apparatus; Fig. 2 is an elevation of part of the mechanism shown in Fig. 1; Fig. 3 is a rear view of the mechanism, a cover plate removed and parts being shown in section, the apparatus being adjusted to correspond with a pressure within the normal range of pressures; Fig. 4 is a view showing the adjustment of the apparatus to permit of the application of pressure beyond the normal range of pressures, this figure illustrating the valve held open; Fig. 5 is a sectional view on line 5—5 of Fig. 4; and Fig. 6 is a sectional view on line 6—6 of Fig 4.

In equipment for supplying pneumatic tires with air under pressure, there is provided a receiver or tank 10' for compressed air, a pipe 10 for conducting air from the tank or receiver, and a flexible service hose 11' having at its discharge end an ordinary valve-controlled chuck 11². Casing 12 encloses part of the operating mechanism and furnishes a support for other parts. Extending through one wall of the casing 12 is a valve casing 18 which is adjustably mounted in the wall of the casing 12 by means of nuts 18' screwed onto the casing 18 on opposite sides of the wall of the casing 12. One end of the valve casing 18 is connected with the pipe 10. In the casing 18 is a passage 19 having the valve seat 20 and communicating by means of a lateral passage 21 with the tube 11. In the passage 19 is mounted the valve 24 adapted to cooperate with the valve seat 20, having the stem 26 slidably mounted in a guide opening in the wall of the casing 18. A spring 25 tends to hold the valve 24 seated. At one end of the casing 12 is a diaphragm chamber 13 in which is arranged a diaphragm 14 against which rests a plate 15. A pin 16 projects from the plate 15 slidably through the inner wall 17 of the diaphragm chamber. A fitting 11[5], preferably of the T type, communicates with the tube 11 and with the by-pass 22 extending through the outer wall 17' of the diaphragm chamber 13 and also with the service hose 11'.

It will be obvious that when the valve 24 is open, air may pass from the pipe 10 through the casing 18 and the tube 11 and the fitting 11[5] to the service hose 11' and also through the by-pass 22 to the diaphragm chamber 13. At the end of the casing 18, which is mounted in the wall of the casing 12, is a filler sleeve 18[4] and packing 18[2]. Extending through the packing nut, the packing and into the sleeve 18[4] in alignment with the stem 26 is a plunger 26', having the perforated end 26[3]. In the passage 22 is mounted a choker 27 having a passage 28 extending through it. The passage 28 at one end communicates with a transverse groove 28' in the end of the choker 27. A similar but much smaller groove 29 is provided in the other end of the choker 27 and communicates with the passage 28. Extending loosely through this passage is a pin 30 having on one end a head 31, adapted when the pin is raised to close the outer end of the passage 28, except for the groove 29, and having on its other end a head 32. When air is flowing from the pipe 22 into the diaphragm chamber, the passage 28 is restricted by the head 31 of the pin 30 to the amount of air which can pass through the groove 29. On the other hand, the groove 28' is of such size that the flow of air out of the diaphragm chamber is not restricted by the head 32. Thus air will more quickly flow from the diaphragm chamber than it flows into it. The advantage of this arrangement will hereinafter more full appear. Any other suitable device for changing the rate of flow of air to and from the diaphragm chamber may be used.

Pivoted in the casing 12 as at 33, is a lever 34, one end of which is adapted to coact with the pin or plunger 16, so that when the diaphragm 14 is moved upwardly, the lever 34 is actuated for movement in one direction. A screw bolt 35 is slidably extended through the wall of the casing 12. A coil spring 36 is connected with the screw bolt 35 and the lever 34 for tending to actuate the lever 34 in the other direction. Means are provided for regulating the tension on the spring 36 for adjusting the device to supply the desired pressure to the tire, thereby determining the pressure to be so supplied. On the end of the screw bolt 35 outside the casing 12 is mounted a tubular screw-threaded sleeve 37 on which is a crank handle 38. It will be seen by screwing the sleeve 37 against the casing 12 in one direction, the tension of the spring 36 will be increased, while by rotating the sleeve 37 in the opposite direction, the tension of the spring 36 will be decreased.

Means are also provided for visibly indicating the pressure, for which the device is adjusted. Mounted on the casing 12 is a guide casing 39 in which travels a rack bar 40. A pin 41 extends from the screw bolt 35 through a slot 42 in the wall of the casing 12 and connects with the rack bar 40, so that the longitudinal movement of the screw bolt 35 imparts movement to the rack bar 40. Supported on the casing 39 is a projecting casing 43, which carries a shaft 44. On the inner end of the shaft 44 is a pinion 45, which meshes with the rack bar 40. Supported on the outer end of the casing 43 is a dial or the like 46, having suitable indicating characters 47 thereon, to indicate various numbers of pounds of pressure. On the outer end of the shaft 44 is an indicating finger 48. The parts are so arranged that the finger 48 will move to positions adjacent to the proper indicating characters 47 for showing the pressure to which the device is adjusted to inflate the tire. Pivotally mounted in the casing 12 is a lever or the like 49, mounted on the pivot 50 and having the limits of its movement on its pivot fixed by means of stop pins 51 and 52. One end of the lever 49 is designed to coact with the end of the stem 26 through the following described mechanism. A U-shaped piece of wire 49' has one end inserted through the lever 49 and the other end inserted through the perforated end 26[3] of the plunger 26', thereby forming an operative connecting link between the plunger 26' and the lever 49. The link 49' is held against accidental separation from the lever 49 by a strip of spring material 50' fastened to the lever 49. Pivoted to the other end of the lever 49, as at 53, are links 54. In the lever 49 is a hole 55. A pin 56 of substantially smaller diameter than the hole 55 projects through the hole, the walls of which thus serve as stops for limiting the pivotal movement of the links 54. The pin 56 is pivoted to an arm 57, which is extended through a slot 58 in the lever 34. In the slot 58 is mounted a roller 59. The arm 57 has a V-shaped point 60 arranged to coact with the roller 59. A spring 61 is secured to the arm 57 and to the stop pin 52 for yieldingly holding the arm 57 in engagement with the roller 59, and also for actuating the arm 57 lengthwise as provided for by the structure and mounting of the links 54 as hereinafter described. A pin 62 extends from the lever 49 through a hole 63 in the wall of the casing 12. A striker arm 64 is pivoted on the casing 12 and at one end forms a bell tapper. This end tends to drop by gravity till it rests away from contact with the bell. Mounted on a post 66 on the casing 12 is a bell 67.

Assuming that it is desired to put sixty pounds of air into the tire, the operator turns the crank 38 for rotating the screw-threaded sleeve 37 on the screw bolt 35. The pin 41 actuates the rack bar 40 for thereby rotating the pinion 45 and moving the indicating finger 48 around the face of the dial to the characters thereon indicating sixty pounds. The parts are so adjusted that the tension of the spring 36 will then be such that it will require sixty pounds pressure on the diaphragm 14 to overcome the tension of the spring 36, and, consequently, as will more fully appear, when sixty pounds pressure has been placed in the tire, the device will no longer operate. It is entirely practical and customary for receivers, for instance, such as 10', to be regularly supplied with air pressure considerably higher than the maximum pressure to which it is desired to inflate any tire. Such higher pressure in the receiver is necessary for the proper operation of this device. It will be understood that before the device is assembled in the final installation, the spring 36 will have been put under some tension, and when under tension, the lever 34 will stand in its full line position for holding the valve 24 open. When the tube 10 is connected with the receiver 10', the receiver pressure is built up in the tube 11', closed by the chuck 11². This pressure also passes slowly through the choker 27, into the diaphragm chamber and being higher than the maximum tension which is ever applied to the spring 36 will actuate the lever 34, moving it until the roller 59 stands in its dotted line position. This action of the lever 34, as hereinafter more fully explained, serves to move the lever 49 for moving the plunger 26' away from the stem 26 and permitting the spring 25 to close the valve 24. The device is now ready for use. The valve 24 being closed when the chuck is placed over the valve stem of the automobile tire and air passes out through the pipe 11 and the service hose 11', the pressure in the hose 11' and in the pipe 11 and in the diaphragm chamber 14 will be reduced, whereupon the spring 36 will actuate the lever 34. When the roller 59 passes over the point 60, the spring 61 will cause the left-hand beveled face of the point 60 to travel along the roller 59 for moving the arm 57 to the right. This will cause the link 54 to swing until the pin 56 engages the wall of the hole 55 and then to move the lever 49 on its pivot 50 from its dotted line position shown in Fig. 3 to its full line position shown in that figure. The movement of the lever 49 thus described causes the plunger 26' to engage the stem 26 for unseating the valve 24 against the air pressure and the pressure of the spring 25.

When the valve 24 is opened, compressed air passes from the pipe 10 to the valve casing 18 and to the pipe 11 and the tube 11', and through the groove 29 and the passage 28 to the diaphragm chamber.

The sizes and arrangements and mounting of the parts are such as to provide air passages sufficiently large that when the valve 24 is opened, the full pressure of the receiver or source of air supply is admitted to the hose 11', and is maintained in spite of the discharge into the tube and diaphragm chamber. This pressure is admitted to the diaphragm chamber more slowly on account of the reduced passage 29 and approximately one or two pounds is supplied to the tire before the diaphragm pressure becomes great enough to cause the diaphragm to actuate the lever 34, moving it toward the right against the tension of the spring 36, until the roller 59 travels over the point 60 and again closes the valve 24. When the arm 49, moves to the dotted line position, allowing the valve 24 to close, the pin 62 strikes the upper end of the arm 64, so that the tapper end strikes the bell and then moves away and stands slightly spaced from it. Thus the bell is tapped every time the valve is closed. With the valve 24 again closed, the pressure in the tubes 11' and 11² and in the diaphragm chamber 13 equalizes with the pressure in the tire and if this pressure is still lower than that for which the device is set, in this instance sixty pounds, as indicated by the needle 48 and the numerals 47, the spring 36 will again actuate the lever 34, moving it to the left until the roller 59 passes across the point 60, and the valve 24 is again opened as previously described and a new cycle of operations ensue. These cycles of operations follow one another in rapid succession at the rate of approximately one per second, until enough air has been supplied to the tire so that when the valve 24 is closed and the pressure in the tubes 11', 11² and the diaphragm chamber 13 equalizes with the tire, it will still be high enough that the spring 36 can no longer actuate the lever 34 against the pressure on the diaphragm 14, whereupon the operations cease. The valve 24 remains closed and no more air is admitted from the receiver and the tapping of the bell also ceases, indicating to the user that the tire pressure has reached the point at which the indicator 48 is set. In this connection, it will be remembered that the spring 61 is so arranged that it tends not only to hold the arm 57 in engagement with the roller 59, but also to move the arm 57 slightly to the left.

Owing to the pressure of the spring 25 and the action of the air on both valves 24 and the plunger 26', the valve 24 is being urged to seat before the roller 59 passes the point 60. Should this occur, it would be possible for the point 60 to assume a balanced position on the roller 59 and thus cause the action of the lever 59 to become uncertain and not positive. To avoid this possibility, is the further function of the parts 54, 55, 56, 57 and 61. By providing the links 54 mounted as shown, it will be obvious that the spring 61 tends to move the arm 57 towards the left. This arrangement of the parts in connection with the lost motion mounting of the links 54 prevents any possible balancing or fluttering of the parts with the points 60 on the radial line of the roller 59 and insures a positive action of the lever 49 in each case. If it were not for the lost motion connection of the links 54, the roller might assume a dead center position over the V point 60, so that the arm 57 and the lever 49 would not be actuated positively in either direction. Under this condition, the valve 24 might close for the reasons given above, and with the pressure thus shut off, the roller never would clear the point 60. However, on account of the angle of the links 54, with the lost motion connection at 55, the point 60 can never reach such a balanced or centered position. Before the point 60 reaches a centered position on the roller 59, the arm 57 is thrown to the left, the distance permitted by the lost motion connection at 55, which distance is of such magnitude that the point 60 is always carried past center on the roller 59 and the right hand angle face then positively actuates the arm 57 and thereby the lever 49, moving them to the limit in the opposite direction. This construction and resulting action entirely eliminates the undesirable results just mentioned. It thus appears that when the device is not in use and the valve in the chuck $11^2$ is closed, air will flow into the service hose 11' until the pressure against the diaphragm is greater than necessary to overcome the tension of the spring 36, so that the lever 34 will be actuated to move to position for permitting the valve 24 to close. So long as the pressure remains up in the service hose, the device will remain inoperative. When the chuck is placed over the valve stem, the pressure in the air line on the service hose side of the valve 24 will be reduced, thus permitting the spring 36 to actuate the lever 54 for causing the trip mechanism to move to position for opening the vale 24. In this connection, it may be said that when air in a single service hose is used and a device of this kind is interposed in the air line and is set for delivering a certain pressure in the tire, it is necessary that the device be partially actuated according to the pressure in the tire. This is accomplished by providing a mechanism which frequently closes the control valve 24 and permits the pressure in the service hose, the tire and the diaphragm chamber to be equalized, so that if the pressure in the tire is then below the pressure required to actuate the diaphragm and the lever 34 for moving the latter to position permitting the valve 24 to close, the lever 34 will be actuated for opening the valve and allowing flow from the receiver 10' to the tire. Thus in the operation of the machine, the air is delivered to the tire in charges and the valve 24 is successively opened and closed. After the delivery of each charge to the tire, the mechanism is actuated to close the valve, whereupon it becomes subjected to a pressure which is substantially that in the tire. If that pressure is great enough to overcome the spring pressure, the valve 24 remains closed, but if it is not great enough, the cycle of operation continues.

The pressure for which the device is set is visibly indicated on the dial and the continuance of the operation of the device in indicated by the bell.

As illustrated, the apparatus is intended to operate automatically so as to make it unnecessary to test pressure from time to time up to a maximum pressure that may be supplied to a receiver of eighty pounds. If the tire requires air under greater pressure than eighty pounds, the controlling device is initially set for eighty pounds so that the apparatus may automatically operate to this limit and when this limit has been reached, the sleeve 37 is further turned in a spring tensioning direction, thereby moving the rod 68 to turn the arm 69 in a direction to position the roller $26^3$ to hold the valve 24 open against the pressure of the spring 25 so that the filling of the tire is completed in accordance with prior practice, it being now necessary to test pressure of the air in the tire from time to time. The rod 68 is desirably operated by the outer end of the spring 36, when this spring is tensioned beyond its normal range. If preferred, where tires are to be supplied with air under pressure in excess of eighty pounds, the handle 38 may be initially turned to a sufficient extent to maintain the valve 24 open during the entire filling operation, it then being necessary to test the air pressure in the tire from time to time throughout the entire filling operation. The valving mechanism disclosed herein replaces the reducing valving mechanism which has hitherto been employed but it is obvious that my invention is of advantage in conjunction with either kind of valving mechanism.

Changes may be made without departing from the invention.

Having thus described my invention, I claim:

1. The combination with a source of air under pressure; of piping through which air is conveyed from said source to a receiver; a valve between said source and piping; mechanism in controlling relation to said valve and connected with the piping and operable by air admitted thereto from said piping to enable closure of the valve, said mechanism being regulable to enable the closure of the valve at selected air pressure; and adjustable means for holding the valve open in opposition to the valve closing effect of said mechanism to permit air to be supplied to the receiver at any required higher pressure than that permissible by said air operated mechanism.

2. The combination with a source of air under pressure; of piping through which air is conveyed from said source to a receiver; a valve between said source and piping; mechanism in controlling relation to said valve and connected with the piping and operable by air admitted thereto from said piping to enable closure of the valve, said mechanism being regulable to enable the closure of the valve at selected air pressure; and means for holding the valve open in opposition to the valve closing effect of said mechanism to permit air to be supplied to the receiver at a higher pressure than that permissible by said air operated mechanism, said means being adjustable into action by a manually movable part of the air operated mechanism when this movable part is moved beyond its normal range in the manual adjustment of said air operated mechanism.

3. The combination with a source of air under pressure; of piping through which air is conveyed from said source to a receiver; a valve between said source and piping; mechanism in controlling relation to said valve and connected with the piping and operable by air admitted thereto from said piping to enable closure of the valve, said mechanism being regulable to enable the closure of the valve at selected air pressure, said air operated mechanism including a diaphragm chamber having a diaphragm therein, a lever enabling closing of the valve and subject to actuation for this purpose by movement of the diaphragm in one direction, a spring mechanism for moving the lever in an opposite direction, said spring mechanism being regulable to determine the pressure at which the diaphragm will be effective to enable closure of the valve; and means for holding the valve open to permit passage of air to the piping at a higher pressure than that permissible by the air operated mechanism and controlled by said spring mechanism to be made effective when said spring mechanism is adjusted beyond its normal range.

In witness whereof, I hereunto subscribe my name.

THOMAS M. MANSON.